Figure 1:
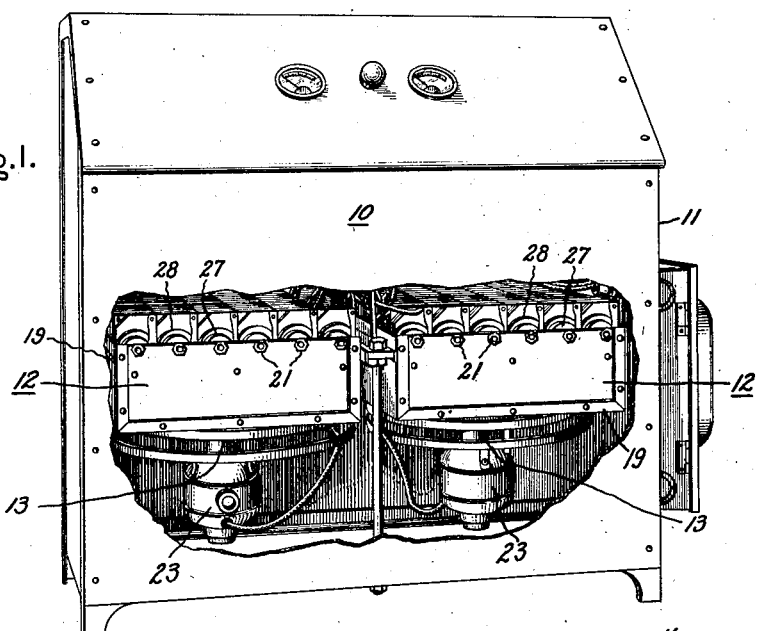

Feb. 13, 1934.   R. D. AMSDEN   1,947,240
RECTIFIER FOR MOTION PICTURE PROJECTORS
Filed Oct. 12, 1932   2 Sheets-Sheet 1

Inventor:
Ralph D. Amsden,
by Charles A. Mueller
His Attorney.

Feb. 13, 1934.  R. D. AMSDEN  1,947,240
RECTIFIER FOR MOTION PICTURE PROJECTORS
Filed Oct. 12, 1932   2 Sheets-Sheet 2

Inventor:
Ralph D. Amsden,
by *Charles E. Tullar*
His Attorney.

Patented Feb. 13, 1934

1,947,240

UNITED STATES PATENT OFFICE 1,947,240

RECTIFIER FOR MOTION PICTURE PROJECTORS

Ralph D. Amsden, Lynn, Mass., assignor to General Electric Company, a corporation of New York Application October 12, 1932. Serial No. 637,459

4 Claims. (Cl. 175—366)

My invention relates to current-rectifying apparatus of the dry rectifier type designed to supply direct-current power from alternating-current lines for the operation of motion picture arc lamps or the like, and its principal object is the provision of an improved apparatus arrangement and of an improved air-cooling means for the rectifier apparatus, whereby relatively high current outputs for the arc lamps of high power motion picture projectors are obtained from a low-cost rectifying apparatus of the dry-rectifier type.

In the recent past a large number of rectifying apparatus have been employed to supply direct current from alternating-current means for the arc lamps of motion picture projectors in small or medium sized theatres. Such rectifying apparatus have been of relatively low capacity, for example, 20 to 30 amperes, for operating the so-called "low-intensity" projectors.

While these equipments have been generally satisfactory, rapid changes in the motion picture art have occurred demanding changes in the projector equipment. Color pictures, wide film, greater screen area, etc., all require more light at the projector. To meet this demand theatres have been and are changing from the above-mentioned "low-intensity" projectors, operating at an arc current of 20 to 30 amperes, to the "high-intensity reflector type" projector operating at an arc current of 60 to 70 amperes.

Difficulties have been encountered, however, in the attempt to develop a copper-oxide or similar dry rectifier apparatus to supply the high output required in this more recent service in which the high-intensity projectors are employed. Particularly, difficulties have been encountered due to insufficient means for dissipating the heat losses unavoidably present in the operation of the rectifier elements required to supply the relatively heavy current to the projectors, with consequent overheating and failure of the rectifier units.

In accordance with my invention, these and other difficulites are avoided, and a rectifying apparatus of low first cost and one easily installed and maintained is provided for high-intensity projectors or like uses, by a special arrangement of apparatus, and a special cooling arrangement including a forced-draft air-cooling means whereby undue temperature rise in the rectifier elements is prevented.

In the above-mentioned air-cooling means in accordance with my invention, small electric blowers draw cool air from below the rectifier apparatus unit, force the air over the rectifier elements and in contact with radiating fins of special form associated with these elements, and thence out through the upper portion of the unit. Baffle elements are so arranged with relation to the rectifier elements and the blowers that the air blast is directed solely over the rectifier elements and the radiating fins associated therewith, and is maintained out of contact with insulating and mounting members employed in connecting the rectifier elements to the frame or casing of the apparatus unit, all of the air supplied from the blowers being, therefore, made use of to the best advantage in dissipating the heat losses.

My invention will be better understood from the following description when considered in connection with the accompanying drawings and its scope will be pointed out in the appended claims.

Figure 2:
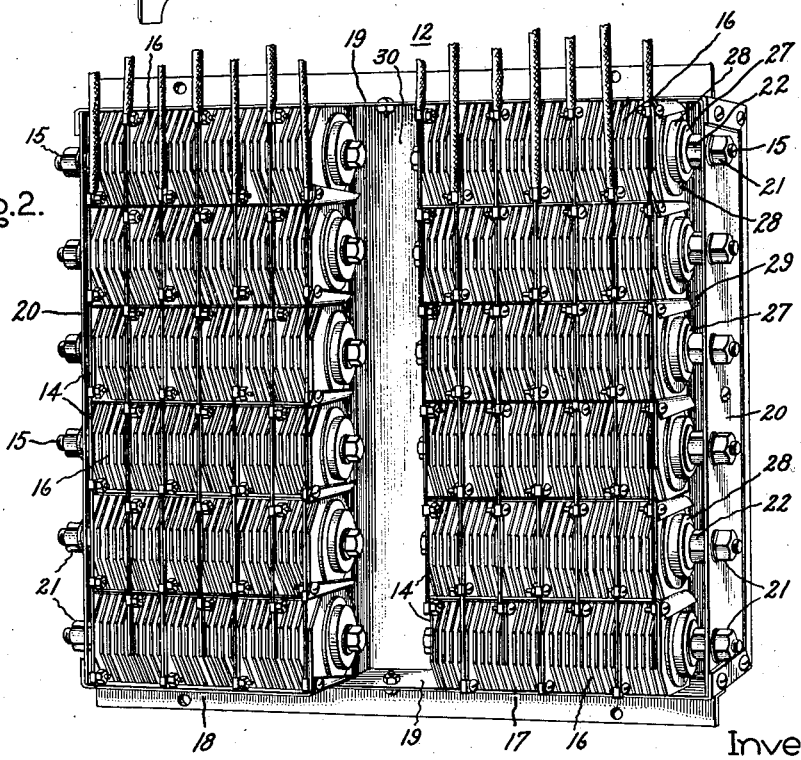

Referring to the drawings, Fig. 1 is a perspective view of a rectifying apparatus unit in accordance with my invention, the front of the casing member being broken away to show two rectifier units, together with blowers mounted therein; Fig. 2 is a top view on a larger scale of one of the rectifier units shown in Fig. 1; and Fig. 3 is a bottom view on a larger scale of one of the rectifier units and the blower associated therewith, shown in Fig. 1.

In the perspective view of Fig. 1, the numeral 10 designates a rectifying apparatus comprising a casing 11 open at the bottom for the ingress of air and in which are mounted, preferably horizontally, two rectifier units 12 each provided with a blower 13 which is located below and may be connected directly to the corresponding rectifier unit. The units 12 may be arranged in parallel by suitable switch connections (not shown) to supply a single 60 or 70 ampere projector, or each unit may alone supply a low power projector.

As shown more clearly in Fig. 2, the rectifier units 12 preferably each comprise a plurality of rectifier assemblies 14 made up in the usual manner by clamping copper oxide or other active elements, together with lead or other conducting plates, on a bolt or rod 15. Each assembly 14 comprises a plurality of radiating fins 16. The composition of the dry rectifier elements forms no part of my present invention and need not be further described herein. The rectifier assemblies 14 comprised in one of the rectifier units 12 are arranged in two sections 17, 18, the assemblies of each section being mounted side by side in a shallow casing member 19, to the side walls 20 of which the rectifier assemblies are fastened by means of the bolts 15 and nuts 21, 22.

Figure 3:
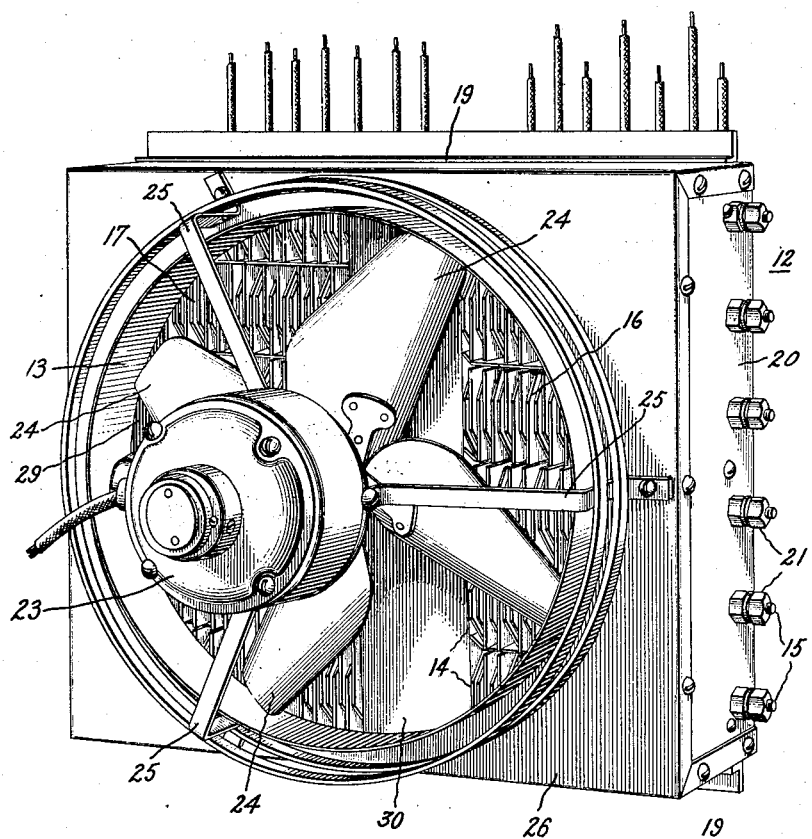

The blowers, as shown in the bottom view of Fig. 3, comprise each an electric motor 23 and a fan 24, each blower being so mounted, as by brackets 25 attached to the bottom plate 26 of a shallow open-topped casing 19, that the fan is located relatively closely to the under sides of the corresponding rectifier assemblies 14.

It will be understood that the blowers 13 are so arranged that the air blast is drawn in at the bottom of the apparatus casing 11 and is forced upwardly through the shallow open-topped casings 19 containing the rectifier assemblies 14 arranged each in the sections 17, 18, the blast finally passing out of the main casing 11 through a suitable opening or openings (not shown) in the upper portion thereof.

In order to direct the air blast solely over the active elements of rectifier assemblies 14 and the radiating fins 16 forming part of these assemblies, I provide baffle elements as plates 29 extending from closely adjacent the lower edges of the outer ends of rectifier assemblies 14 to the side walls 20 of the shallow casings, and plates 30 extending between the lower edges of the inner ends of the rectifier assemblies constituting the sections 17 and 18 respectively. The space above the fan 24 in each rectifier unit 12 is thus open for the passage of the air blast in the region of the active elements and radiating fins of the rectifier assemblies, but is entirely closed in the region of the rectifier assembly mounting means comprising such elements as the clamping nuts 22, spring and compression washers 27, and insulating washers 28.

It will be observed that the arrangement of the closely spaced rectifier assemblies 14 with respect to the fans and to the air baffling means comprising the shallow casings 19 and the baffle elements 29 and 30 is such that all of the air used for cooling is directed over the active elements of the rectifier units and between the radiating fins which draw the heat from the rectifier discs, the baffling means which are provided preventing the air from flowing over the mounting portions of the assemblies at the ends thereof, or, in general, from flowing anywhere except directly in contact with the fins and those portions of the units on which the fins are mounted. Consequently, efficient use is made of all of the air which is forced through the apparatus by the fans.

The fins 16 are specially shaped, for example, flattened at the sides, to permit the mounting of the rectifier assemblies 14 closely adjacent each other. The fins are preferably substantially .050 inch in thickness which I have found is the proper thickness to cause the cooling air to conduct away the heat in the quantities in which it is generated in the rectifier discs. Radiating fins employed, particularly in copper-oxide rectifiers, previously to my present invention have been constructed of much thinner sheet metal than above specified. I have found that when fins of the thinner material were employed, after the rectifier apparatus was shut down and the fan stopped, a thermometer placed on the fins showed a temperature rise of 8 to 10 degrees, showing that fins of such character were not desirable for use in connection with the large output rectifier apparatus to which my invention is directed. I have found that when radiating fins of substantially .050 inch thickness are employed, the temperature will rise only from 1 to 2 degrees, showing that heat is conducted away from the active rectifier elements as fast as it is generated therein, and that the rectifier discs are kept as cool in operation as they should be kept in order to give satisfactory aging characteristics.

What I claim as new and desire to secure by Letters Patent of the United States, is:

1. A rectifying apparatus for supplying direct current to high intensity arc projectors and the like comprising a rectifier unit including a plurality of rectifier assemblies of the dry disc type mounted closely adjacent one another, each of said assemblies including a plurality of active elements and heat radiating fins, blower means adapted to supply cooling air to said unit, and means to cause the cooling air in passing through said rectifier unit to flow only over that portion of each assembly including said active elements and said fins.

2. A rectifying apparatus for supplying direct current to high intensity arc projectors and the like comprising an apparatus casing, a plurality of rectifier units mounted therein, each of said units including a plurality of rectifier assemblies of the dry disc type mounted side by side closely adjacent in substantially the same plane, each of said assemblies including a plurality of active elements and heat radiating fins, a plurality of blowers each connected below a different one of said rectifier units to cause air to flow through said casing in contact with said units, and baffle means assocated with said units to cause the air blast from said blowers in passing through said rectifier units to flow only over said active elements and said fins.

3. A rectifying apparatus for supplying direct current to high intensity arc projectors and the like comprising a rectifier unit including a plurality of rectifier assemblies of the dry disc type, each of said assemblies including a plurality of active elements and heat radiating fins, a relatively shallow casing member, means to mount said assemblies closely adjacent each other in said casing, a blower mounted adjacent said casing to force air over said assemblies, and baffle means associated with said casing to cause said air in passing through said assemblies to flow only over said active elements and said fins.

4. A rectifying apparatus for supplying direct current to high-intensity arc projectors and the like comprising a rectifier unit including a plurality of rectifier assemblies of the dry disc type, said assemblies being arranged side by side and closely adjacent in the same plane, each of said assemblies including a plurality of active elements and heat radiating fins, the thickness of said fins being substantially .050 inch, blower means associated with said unit to force cooling air therethrough, and means to cause said cooling air in passing through said unit to flow only over said active elements and said radiating fins.

RALPH D. AMSDEN.